United States Patent
Galmiche et al.

(10) Patent No.: US 6,817,627 B2
(45) Date of Patent: Nov. 16, 2004

(54) AIR BAG ASSEMBLY FOR A MOTOR VEHICLE

(75) Inventors: Etienne Galmiche, Etupes (FR); Frédéric Vannelli, Mezire (FR)

(73) Assignee: Faurecia Industries, Nanterre (FR)

( * ) Notice: Subject to any disclaimer, the term of this patent is extended or adjusted under 35 U.S.C. 154(b) by 0 days.

(21) Appl. No.: 10/208,761

(22) Filed: Aug. 1, 2002

(65) Prior Publication Data

US 2003/0030253 A1 Feb. 13, 2003

(30) Foreign Application Priority Data

Aug. 7, 2001 (FR) ............................................. 01 10559

(51) Int. Cl.$^7$ ............................................. B60R 21/22
(52) U.S. Cl. ............................................. 280/730.1
(58) Field of Search .................... 280/728.3, 730.1, 280/805, 751, 752, 730.2; 296/188, 190.01; 297/488, 487

(56) References Cited

U.S. PATENT DOCUMENTS

| | | | |
|---|---|---|---|
| 5,211,421 A | * | 5/1993 | Catron et al. ............ 280/728.2 |
| 5,536,043 A | | 7/1996 | Lang et al. |
| 6,158,763 A | * | 12/2000 | Dominique et al. ...... 280/728.2 |
| 6,302,437 B1 | * | 10/2001 | Marriott et al. ............ 280/732 |
| 6,378,902 B2 | * | 4/2002 | Unger et al. ............... 280/753 |
| 6,435,554 B1 | * | 8/2002 | Feldman ................. 280/743.2 |
| 6,631,920 B1 | * | 10/2003 | Webber et al. ........... 280/730.1 |

FOREIGN PATENT DOCUMENTS

| | | |
|---|---|---|
| EP | 1 028 033 | 8/2000 |
| FR | 2 781 442 | 1/2000 |
| WO | 00/05105 | 2/2000 |

\* cited by examiner

*Primary Examiner*—Faye M. Fleming
(74) *Attorney, Agent, or Firm*—Young & Thompson

(57) ABSTRACT

A motor vehicle equipment assembly includes an air bag support, an air bag fixed to the support, a force spreader plate for spreading the force of the impact of a passenger against the air bag, and frangible fixing device fixing the plate to the support. The air bag includes the force spreader plate and a sheath of substantially closed cross-section. The sheath is fixed to the force spreader plate along one end—in such a manner that the inside volume of the air bag is defined by the sheath and by the force spreader plate.

15 Claims, 6 Drawing Sheets

AIR BAG ASSEMBLY FOR A MOTOR VEHICLE

The invention relates to a motor vehicle equipment assembly, of the type comprising: an air bag support; an air bag fixed to the support by first fixing means, the air bag having a rest configuration and a deployed configuration; a force spreader plate for spreading the impact force from a passenger over the air bag, said plate having a visible surface forming a portion of the facade of the equipment in the mounted state; and frangible fixing means fixing said plate relative to the support when the air bag is in its rest configuration, which means are broken under the force for deploying the air bag.

The invention applies in particular to air bags for protecting the knees of passengers in motor vehicles.

BACKGROUND OF THE INVENTION

In the state of the art, e.g. document U.S. Pat. No. 6,131 950, an air bag assembly is already known for retaining the knees of passengers. That assembly comprises an air bag support, an air bag, and a force spreader plate.

The air bag has an open end which is fixed to the support and it has a closed end. The closed end of the air bag is fixed along the edge of the force spreader plate and the air bag bears against the rear surface of the plate. For this purpose, a wire frame is inserted in the air bag, which frame matches the outline of the edge of the plate. The edge of the force spreader plate is folded over the frame, thereby crimping the air bag.

That assembly is difficult to manufacture because of its numerous parts and it requires a large quantity of material.

OBJECTS AND SUMMARY OF THE INVENTION

An object of the invention is to mitigate those drawbacks and to provide low cost air bag equipment for a motor vehicle, the equipment including a rigid force spreader element.

To this end, the invention provides an assembly of the above-specified type, wherein the air bag comprises the force spreader plate and a sheath of substantially closed cross-section, wherein the sheath has a first end fixed to the support by said first fixing means and a second end, and wherein the sheath is fixed to the force spreader plate along said second end by second fixing means in such a manner that the inside volume of the air bag is defined in its portion close to the second end of the sheath by the sheath and by the force spreader plate secured to the sheath.

In particular embodiments, the assembly of the invention further comprises one or more of the following characteristics:

said first and/or second fixing means comprise clamping means for clamping the sheath against said plate and/or against said support;

the clamping means comprise:
openings formed in said respective first or second end of the sheath;
studs placed on the plate and/or the support and extending through the openings; and
members co-operating with the studs and clamping the corresponding end of the sheath against the surface of the plate or of the support respectively;

said first and/or second fixing means comprise a portion of the support and/or of the plate molded onto said respective first or second end of the sheath;

said first and/or second fixing means comprise said respective first or second ends of the sheath fixed to the support and/or to the plate by heat-sealing;

the assembly has elastic zones for damping the stresses applied to the plate during deployment of the air bag;

the cross-section of the sheath in the deployed state is substantially constant;

the assembly comprises supplementary impact damping means adapted to damp a second impact of the passenger against the air bag;

the assembly further comprises supplementary means for retaining and guiding the force spreader plate during deployment of the air bag, and these means comprise reinforced portions of the sheath, in particular portions that are formed integrally therewith, said portions extending from said first end to said second end and being fixed firstly to the plate and secondly to the support; and the support is a lining of a door for being hinged to a piece of motor vehicle equipment, and the plate is at least a portion of the visible surface of the door.

BRIEF DESCRIPTION OF THE DRAWINGS

The invention will be better understood on reading the following description given purely by way of example and made with reference to the accompanying drawings, in which:

FIG. 1A is a view of detail IA in FIG. 1 on a larger scale;

FIG. 1B is a view of detail IB in FIG. 1 on a larger scale;

MORE DETAILED DESCRIPTION

Figure 1:
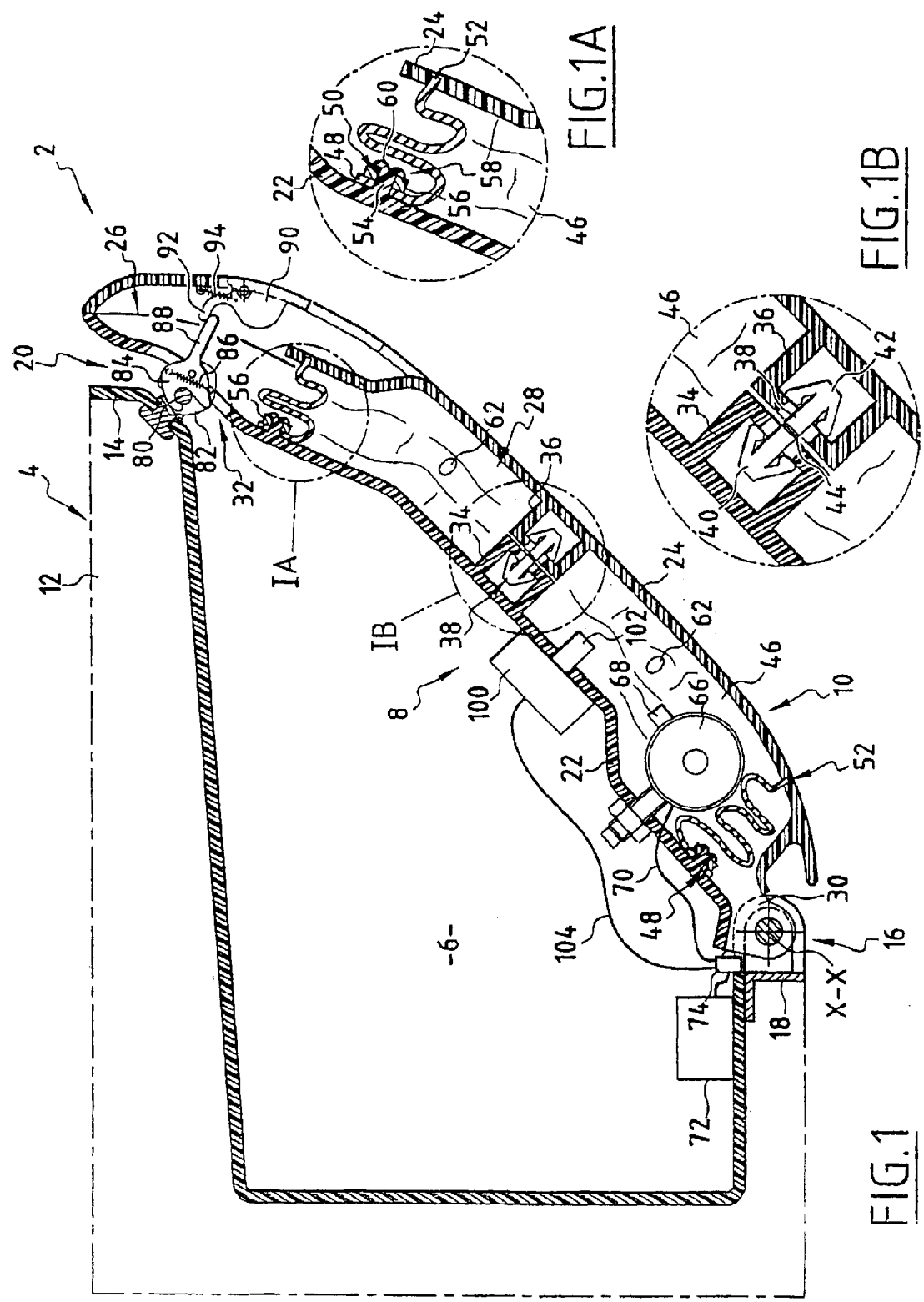
FIG. 1 is a section view of a glove compartment including an assembly of the invention.

FIG. 1 shows a glove compartment assembly of the invention for a motor vehicle, said assembly being given overall reference 2.

In the description below, the term "front" is used to designate the direction facing towards the passenger when the assembly is mounted, and the term "rear" designates the opposite direction.

Figure 2:
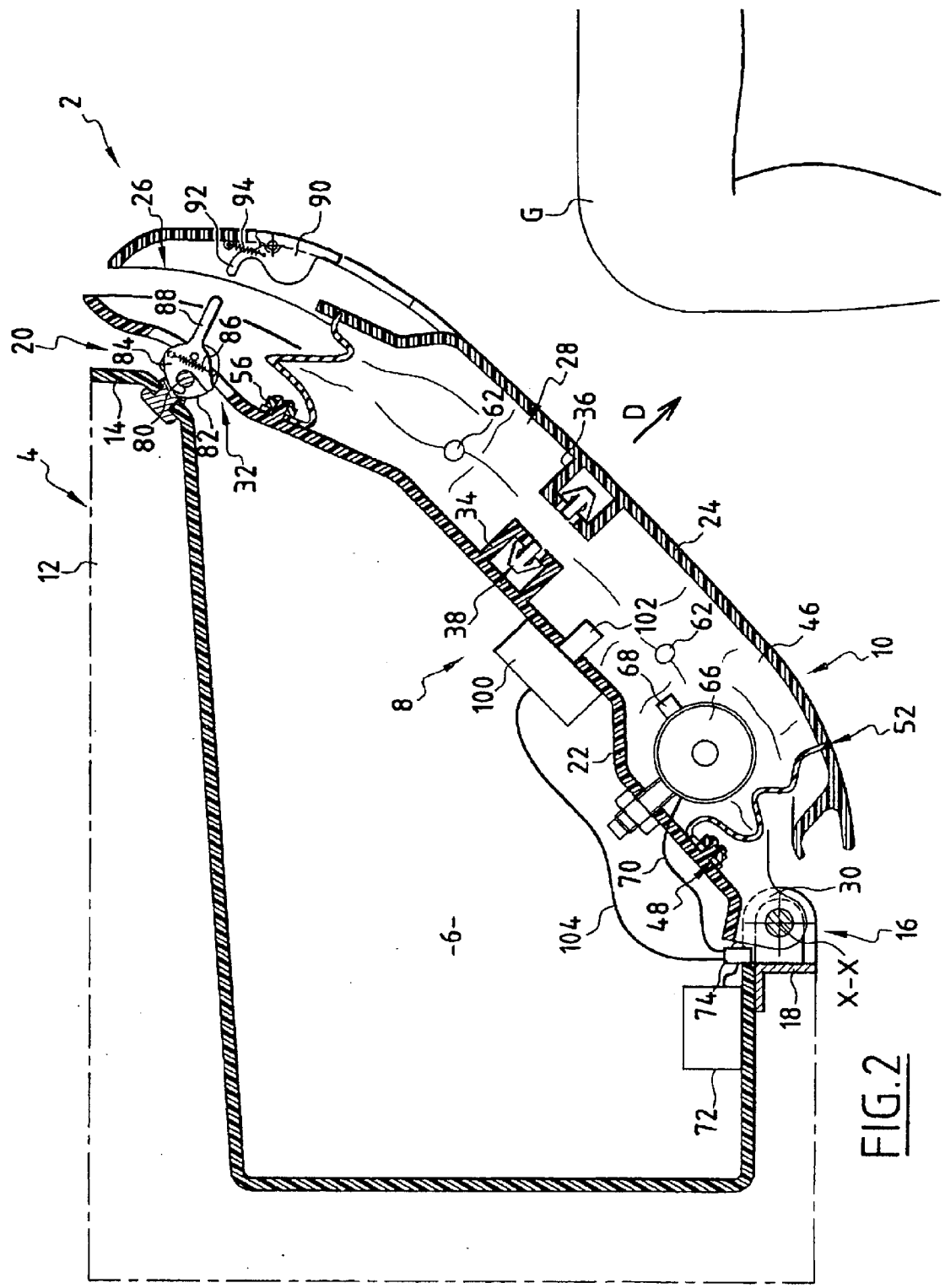
FIGS. 2 to 4 are views of the FIG. 1 glove compartment in different stages of operation.

The assembly 2 comprises a dashboard 4 defining a glove compartment 6 having an opening 8 facing towards the passenger. The assembly 2 further comprises a door 10 covering the opening 8 of the glove compartment 6. When in its closed position, the door 10 is level with knee G of a passenger seated in the vehicle (see FIG. 2).

The dashboard 4 comprises a base member 12 constituted by a layer 14 of plastics material, in conventional manner.

The door 10 is hinged to the bottom edge of the opening 8 about an horizontal axis X—X via a hinge 16 so as to pivot between a closed position, as shown, and an open position in which it tilts downwards in a clockwise direction in FIG. 1. The hinge 16 includes a hinge bracket 18 that is secured to the dashboard 4.

The door 10 can be locked in its closed position by a lock device 20.

The door 10 has a rear lining 22 that constitutes a support and a front facade 24. These two parts 22 and 24 together form a housing space 26 which includes an expansion chamber 28 constituting an air bag. As described below, the facade 24 constitutes a force spreader element.

The rear lining 22 is a plate, e.g. of thermoplastic material. Where appropriate, it can be covered on its rear surface with a decorative sheet. When the door is in the closed state, the lining 22 occupies the entire opening 8 of the glove compartment 6. In its bottom portion, the lining 22 has a hinge bracket 30 forming part of the hinge 16.

An opening 32 is provided in the top portion of the lining 22 for the locking device 20.

Fixing studs 34 (only one is visible in the figures) project from the front surface of the lining 22. The studs 34 are preferably integrally molded with the lining 22, but they could equally well be fitted to the lining 22, e.g. by heat-sealing.

The front facade 24 is preferably made out of a rigid plastics material such as polypropylene, for example, possibly softened by additives such as ethylene-propylene diene monomer (EPDM). In a variant, it can be covered in a skin of flexible plastics material such as polyvinylchloride (PVC).

The facade 24 extends over substantially the entire area of the lining 22 and it is releasably fixed thereto. As explained below, the facade 24 can be deployed in a deployment direction D. The facade 24 extends over the central portion of the door 10 and is spaced apart from the lining 22, being substantially parallel thereto so as to form the housing 26.

FIG. 1B shows greater detail of the way the facade 24 is fixed to the lining 22. It should be observed that there are a plurality of fixing locations distributed over the surface of the door 10, and only one of them is shown in the figures, by way of example.

The facade 24 has fixing studs 36 that project rearwards at locations that correspond to the locations of the studs 34 on the lining 22. These studs 36 are preferably integrally molded with the facade 24. In a variant, they could equally well be secured to the facade, e.g. by heat-sealing.

Corresponding studs 34 and 36 are in register when the door 10 is in the assembled state. The facade 24 is fixed to the lining 22 at the locations of the studs 34 and 36 by frangible snap-fastening elements 38. These frangible elements 38 are constituted by pairs of snap-fastening heads 40 and 42 interconnected by a reduced-section zone 44 of weakness.

Furthermore, the lining 22 and the facade 24 are provided with studs (not shown) that act as spacers between the lining 22 and the facade 24.

With reference again to FIG. 1, it can be seen that the facade 24 and the lining 22 are also connected to each other by a sheath 46.

When seen in a plane perpendicular to the deployment direction D, the sheath 46 is of closed cross-section. The sheath 46 is made of an elastic material, e.g. of elastomer. Its cross-section is preferably substantially constant in a non-deformed state. It can thus be manufactured by extrusion. In variants, it can be made by injection molding a plastics material or by weaving, e.g. a cloth comprising a mixture of polyamide yarns and of elastomer yarns. At its end facing towards the lining 22 it has a first edge 48 with a closed outline and provided with fixing holes 50 (see FIG. 1A). At its end facing towards the facade 24, the sheath 46 has a second edge 52 likewise of closed outline.

The sheath 46 is fixed along its first edge 48 to the lining 22. For this purpose, the lining 22 has a plurality of integral fixing studs 54, which could alternatively be separate pieces fitted thereto, e.g. secured by heat-sealing. The studs 54 project from the front surface of the lining 22 and they are distributed around a fixing outline that encloses a large fraction of the front surface of the lining 22. The first edge 48 of the sheath 46 is fitted onto the studs 54 via its fixing holes 50. Strips 56 of shape corresponding to the fixing outline and including openings 58 corresponding to the studs 54 are then fitted onto the studs. They serve to press against the first edge 48.

The strips 56 are pressed against the first edge 48 by plastically deformed portions of the studs 50, which form rivet heads 60.

The second edge 52 is embedded in the plastics material of the facade 24, for example by overmolding the facade 24 onto the second edge 52.

Furthermore, gas exhaust openings 62 are formed in the sheath 46. These openings 62 allow gas to escape from the sheath 46 after the air bag has been triggered.

The inside volume of the expansion chamber 28 is defined by the inside surface of the sheath 46 and by those portions of the surfaces of the lining 22 and of the facade 24 that are surrounded by the edges 48 and 52 respectively of the sheath 46.

A gas generator 66 is placed in an edge region of the lining 22, specifically in the bottom portion of the door 10 between the lining 22 and the facade 24. It is fixed to the lining 22 and its outlet openings 68 open out into the expansion chamber 28 (only one of the openings 68 is shown). The gas delivery direction is directed towards the lining 22 and towards the facade 24, and also towards the center of the expansion chamber 28. The gas generator 66 is connected by a control line 70 to a deceleration sensor 72 via a switch 74. The sensor 72 is mounted on the dashboard 4 inside the compartment 6. Naturally, the sensor could be mounted at some other location on the structure of the vehicle.

The switch 74 is placed on the dashboard 4, specifically at a location close to the hinge 16 of the door 10. When the door 10 is in the closed position, the switch 74 establishes contact between the sensor 72 and the gas generator 66 enabling the gas generator to be triggered.

When the door 10 is in the open position, the switch 74 is open and prevents the gas generator 66 being triggered.

The locking device 20 comprises three elements:

firstly it has a bar or latch 80 fixed to the top edge of the opening 8;

secondly, it has first and second locking hooks 82 and 84 disposed in the opening 32 of the lining 22 and hinged thereto, the two hooks 82 and 84 are connected to each other by a spring 86 and they can be actuated by a lever 88 secured to the second hook 84; and thirdly, the locking device 20 has a control handle 90 hinged to the facade 24, and an actuating lug 92 projects from the rear surface of the handle 90 and bears against the lever 88.

The handle 90 is free to move in translation relative to the lever 88 in the facade deployment direction D (see below). This separation of the handle 90 from the hooks 82 and 84 makes it possible to use substantially the entire front facade 24 as a force spreader element. A return spring 94 urges the handle 90 towards its rest position.

In supplementary manner, the assembly also comprises an auxiliary device 100 for damping a second impact. The auxiliary device 100 is disposed on the rear face of the lining 22. By way of example, it comprises a foam generator. The device 100 is connected via a plurality of ducts 102 (only one of which is shown) to the expansion chamber 28, and via a control line 104 to the deceleration sensor 72 via the switch 74.

The assembly of the invention operates as follows:

Initially the door 10 is in the position shown in FIG. 1, i.e. the door 10 is closed and the expansion chamber 28 is in its rest position. Contact between the sensor 72 and the gas generator 66 is established via the switch 74.

When the deceleration sensor 72 senses severe deceleration, e.g. during an accident, it triggers the gas generator 66 together with the auxiliary damping device 100. The device 100 then begins to generate foam, but foam generation does not take place as quickly as gas generation. Initially, the gas from the generator 66 fills the space inside the expansion chamber 28 until the pressure against the facade 24 becomes too great and the breaking force of the frangible elements 38 is exceeded. The frangible elements 38 break and the facade 24 moves substantially forwards and downwards in the direction of arrow D (see FIG. 2) under drive from the gas pressure. The locking hooks 82 and 84 remain in their locked position, so the lining 22 remains in place while the control handle 90 moves together with the facade 24.

Figure 3:
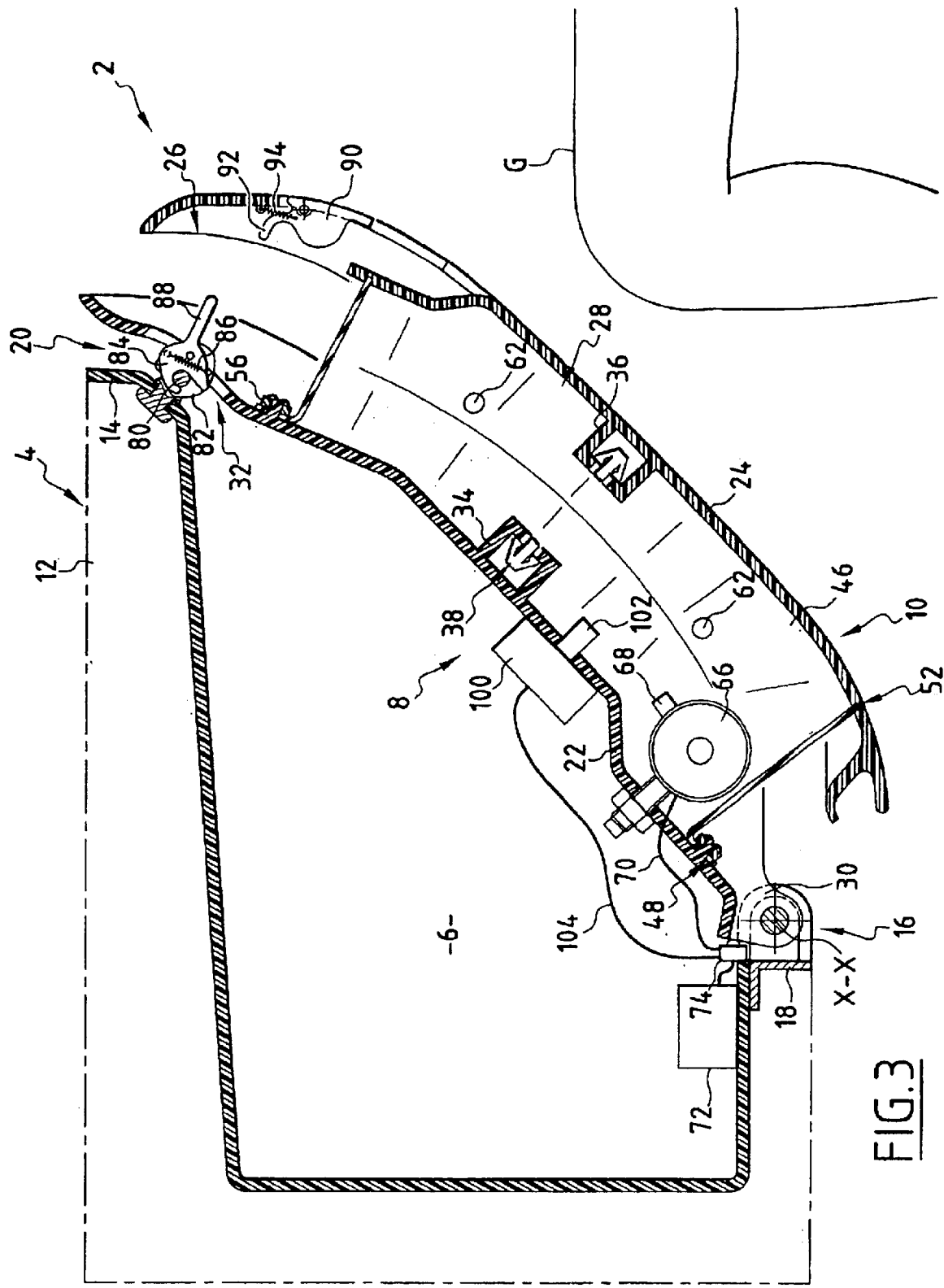

The facade 24 moves quickly until the sheath 46 is fully deployed. Thereafter the sheath 46 becomes elastically tensioned, thereby progressively braking the facade 24 so as to hold it in its deployed position (FIG. 3). The peak force acting on the connections between the sheath 46 and the lining 22 and also the facade 24 is consequently not very high. It should be observed that the inclination of the facade 24 in its deployed position may be determined to have a selected value by cutting the sheath 46 from an extruded tube at an appropriate inclination for the line of cut. There is therefore no need to provide straps for retaining the facade 24 relative to the lining 22 in order to adjust this inclination.

Figure 4:
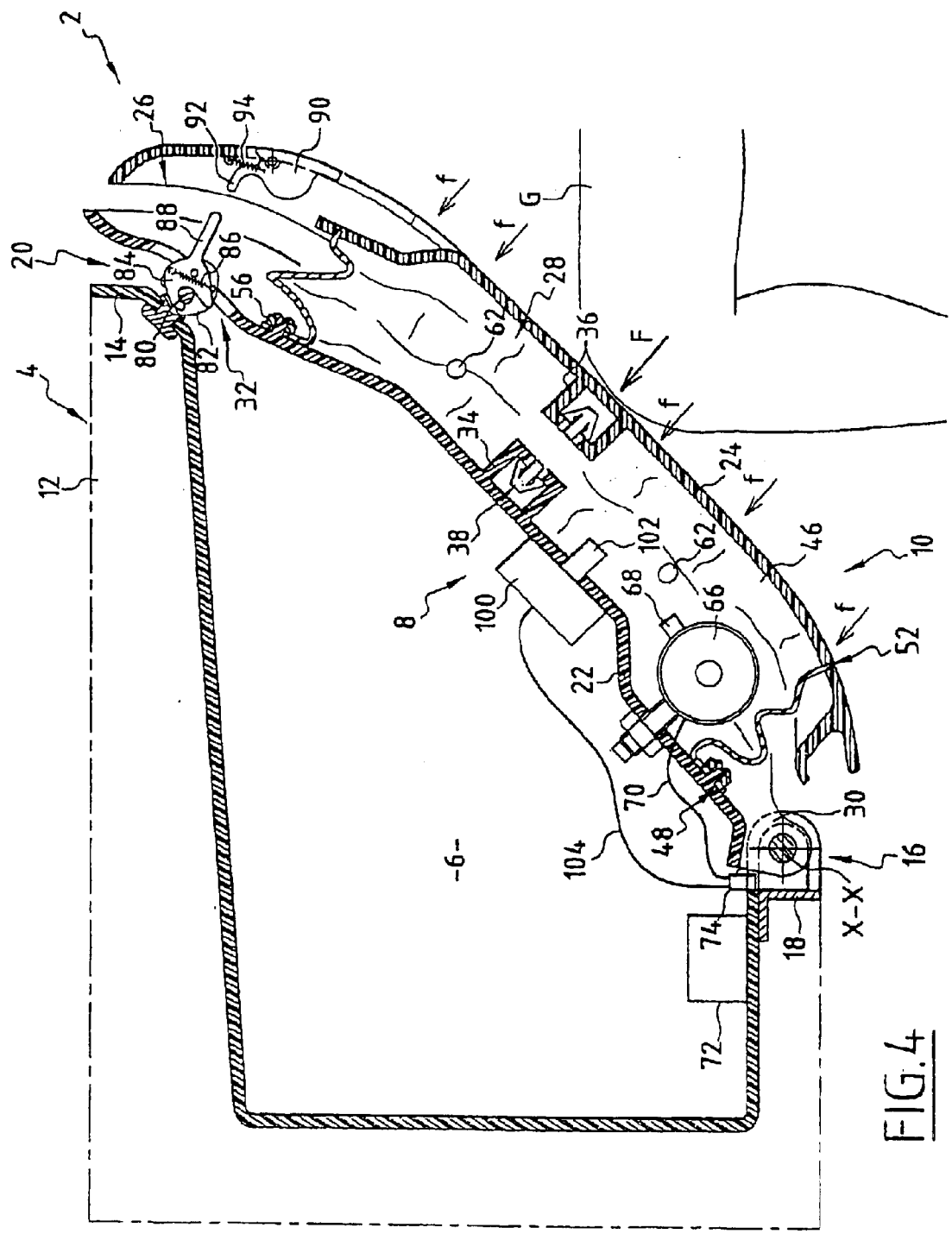

Finally, the knees G of the passenger strike the facade 24 (FIG. 4). The facade 24 spreads the force F from the knees G over substantially the entire front surface (arrows f) of the expansion chamber 28, thereby preventing it from being deformed locally. This prevents immediate penetration of the knees G through the chamber 28. The fact of the facade 24 being rigid thus contributes to proper spreading of the forces.

The gas pressure inside the expansion chamber 28 returns quickly to atmospheric pressure. While this is happening, the device 100 continues to generate foam. When the auxiliary damping device 100 has finished generating foam (e.g. 2 seconds (s) to 10 s after the device 100 is triggered), foam fills a fraction of the expansion chamber 28. This fraction corresponds to about 20% to 80% of the maximum volume of the chamber. Consequently, during a second impact, the passenger's knees G are again protected.

When the user opens the door 10 and tilts the door away from its closed position, the switch 74 interrupts the control lines 70 and 104. This prevents the gas generator 66 and the auxiliary device 100 being triggered while the door is in this position, thereby avoiding any risk of the passenger being injured by the facade 24 being deployed.

The door 10 of the invention uses little material, because the facade 24 forming the force spreader element also forms an integral portion of the expansion chamber 28. Consequently, the manufacturing cost of the assembly is low. In addition, because of the elasticity of the sheath 46, the fixing at the edges of the sheath 46 is subjected to only a low level of stop force, thereby increasing the reliability of the assembly.

The fact that the facade 24 does not have any portions capable of opening to allow the air bag to pass through during deployment makes the facade simpler to manufacture and makes it possible to use low cost material when making it.

The door 10 of the invention can be manufactured without any metal parts, and in particular it can be made entirely out of plastics material. Consequently, the risk of injuring a passenger is low.

Figure 5:
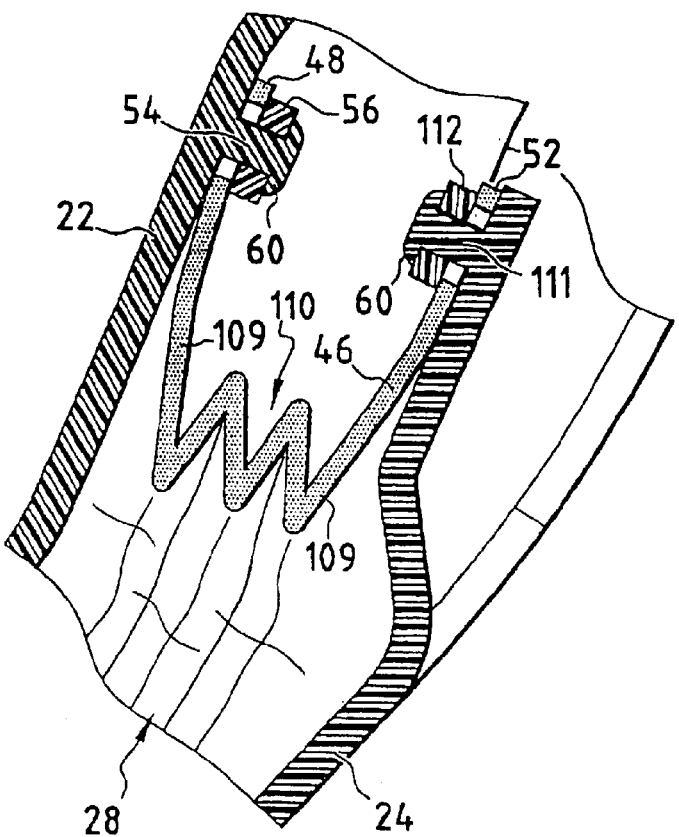
FIG. 5 is a section view showing a detail of a second embodiment of the assembly of the invention.
Figure 6:
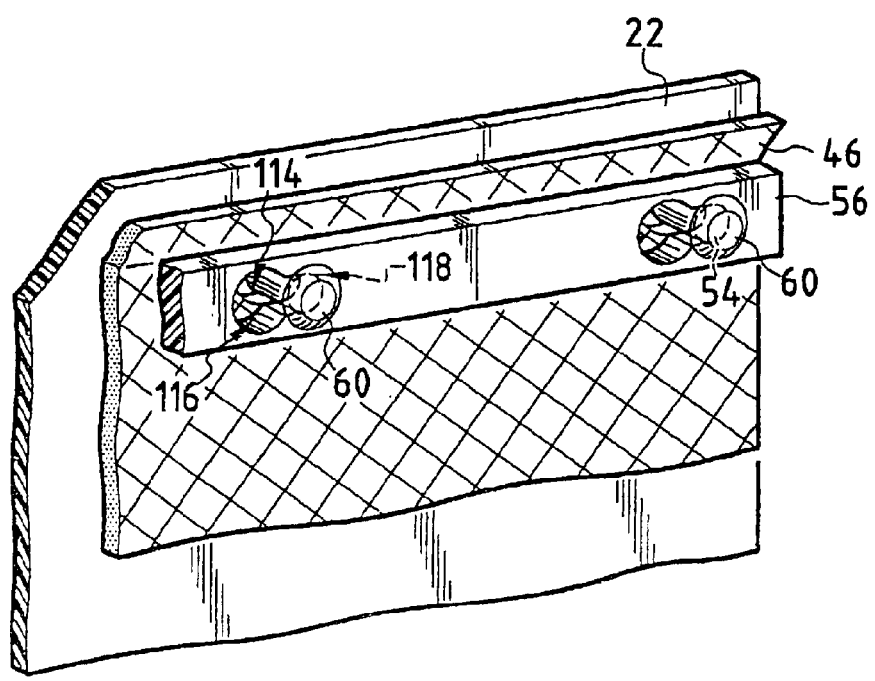
FIG. 6 is a diagrammatic perspective view of a portion of the FIG. 5 detail.

In FIGS. 5 and 6, there can be seen details of a second embodiment of an assembly of the invention.

In the description below, only differences relative to the first embodiment are explained. Elements that are analogous are given identical references.

The sheath 46 is made of woven or knitted material. The sheath 46 has smooth portions 109 and a bellows-forming portion 110. This bellows portion 110 damps the stop force applied to the facade 24 during deployment. The facade 24 has studs 111 analogous to the studs 54 on the lining 22.

The sheath 46 is fixed to the facade 24 and to the lining 22 by means of a strip 56, 112 having keyhole-shaped slots 114. The slots 114 have enlarged portions 116 of a diameter to receive the heads 60 of the studs. It is this portion 116 that enables the strip 56, 112 to be fitted over the heads 60 of the studs. Each slot 114 also has a narrow retaining portion 118.

After the respective strips 56, 112 have been fitted over the studs 54, 111, they are shifted so that the narrow portions 118 come into register with the studs 54, 111. The strips 56, 112 are clamped between the edges 48, 52 of the sheath and the heads 60 of the studs 54, 111.

This embodiment enables the door 10 to be assembled without using tools.

Furthermore, during deployment, the sheath 46 deploys until its smooth portions 109 are under tension. Thereafter the bellows portion 110 progressively brakes the facade 24.

Figure 7:
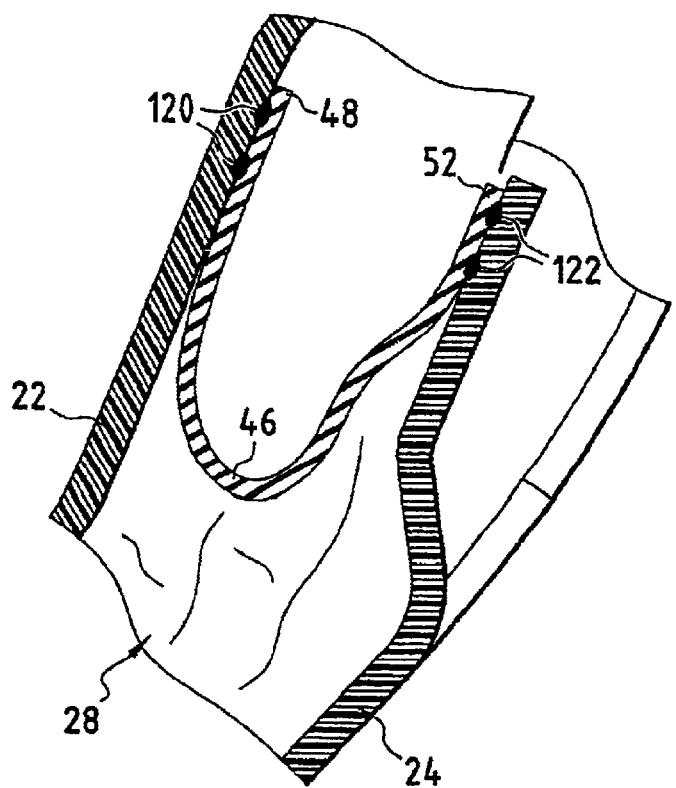
FIGS. 7 and 8 are detail views of third and fourth embodiments of the assembly of the invention.
Figure 8:
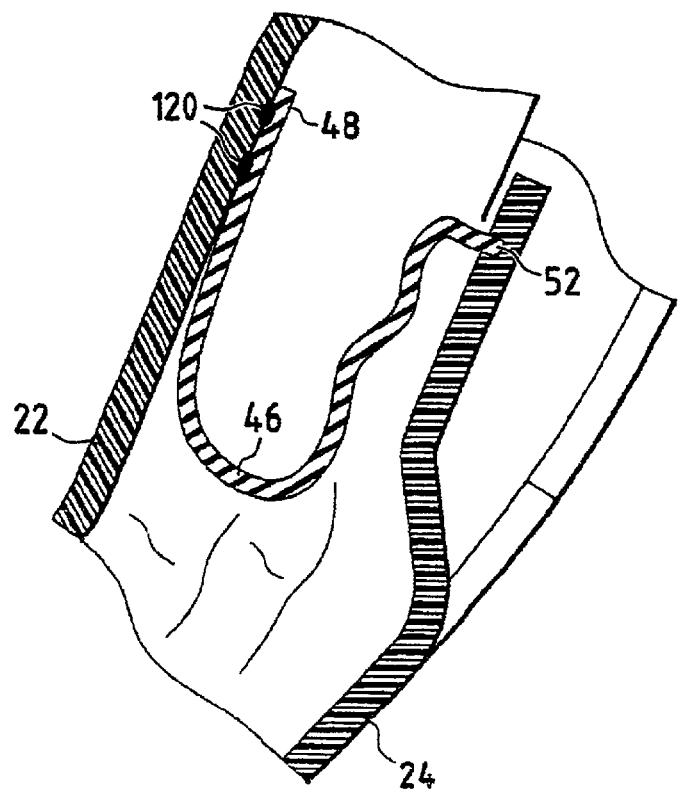

FIGS. 7 and 8 show third and fourth embodiments.

The sheath 46 is made of elastic material, identical to the sheath of the first embodiment. The sheath 46 is fixed to the lining 22 and to the facade 24 by bonding materials together.

In FIG. 7, each edge is fixed by two lines of heat-sealing 120, 122.

In FIG. 8, the sheath 46 is bonded to the facade 24 by being overmolded, as in the first embodiment. The edge 48 of the sheath 46 which is associated with the lining is fixed by heat-sealing.

It should be observed that the means for fixing the first and second edges 48 and 52 of the sheath are independent of each other. For example, the sheath 46 can be fixed to the lining by being overmolded while it is fixed to the facade by being riveted.

In a variant, the sheath could have reinforced portions forming straps for retaining and guiding the plate. They are preferably formed integrally with the sheath. These portions are fixed firstly to the lining and secondly to the facade.

In another variant, the auxiliary damping device 100 releases two components which expand on coming into contact with each other. One example of such a mixture is di-isocyanate and polyol.

In a variant, the studs 34, 54 are made separately from the lining 22 on a reinforcing piece. This reinforcing piece has the studs 34 or 54 in their positions relative to one another so that they correspond to their subsequent positions in the door 10. Thereafter, the lining 22 is fixed to the reinforcing piece.

Naturally, the gas generator 66 and the auxiliary damping device 100 can be grouped together as a single module. The module then has two trigger stages. In a variant, the device 100 can be triggered in a manner that is offset from triggering of the gas generator 66, for example after a delay 1 s to 2 s.

What is claimed is:

1. A motor vehicle equipment assembly, comprising:
   an air bag support;
   a gas generator;
   an air bag fixed to the support by first fixing means;
   a force spreader plate for spreading the impact force from a passenger over the air bag, said plate having an inside surface; and
   frangible second fixing means fixing said plate relative to the support when the air bag is in a rest configuration, which means are broken under the force for deploying the air bag;
   wherein the air bag comprises the force spreader plate and a sheath of substantially closed cross-section,
   wherein the sheath has an inside surface and a first end,
   wherein the sheath has a second end formed by an edge of closed outline,
   wherein the sheath is fixed to the force spreader plate along said second end by second fixing means in such a manner that an inside volume of the air bag is defined in a portion adjacent to the second end of the sheath by the inside surface of the sheath and by a portion of the inside surface of the force spreader plate, and
   wherein said inside surface of the sheath and said portion of the inside surface of the force spreader plate are exposed to a gas introduced into the air bag by said gas generator during deployment of the air bag.

2. An assembly according to claim 1, wherein said first and/or second fixing means comprise clamping means for clamping the sheath against said plate and/or against said support.

3. An assembly according to claim 2, wherein the clamping means comprise:
   openings formed in said respective first or second end of the sheath;
   studs placed on the plate and/or the support and extending through the openings; and
   members co-operating with the studs and clamping the corresponding end of the sheath against the surface of the plate or of the support respectively.

4. An assembly according to claim 1, wherein said first and/or second fixing means comprise a portion of the support and/or of the plate molded onto said respective first or second end of the sheath.

5. An assembly according to claim 1, wherein said first and/or second fixing means comprise said respective first or second ends of the sheath fixed to the support and/or to the plate by heat-sealing.

6. An assembly according to claim 1, wherein the assembly has elastic zones for damping the stresses applied to the plate during deployment of the air bag.

7. An assembly according to claim 1, wherein the cross-section of the sheath in the deployed state is substantially constant.

8. An assembly according to claim 1, comprising supplementary impact damping means adapted to damp a second impact of the passenger against the air bag.

9. An assembly according to claim 1, further comprising supplementary means for retaining and guiding the force spreader plate during deployment of the air bag, and wherein these means comprise reinforced portions of the sheath, said portions extending from said first end to said second end and being fixed firstly to the plate and secondly to the support.

10. An assembly according to claim 1, wherein the support is a lining of a door for being hinged to a piece of motor vehicle equipment, and the plate is at least a portion of a visible surface of the door.

11. An assembly according to claim 1, comprising means for adjusting a inclination of the force spreader plate, said means for adjusting being formed by said sheath which is cut from an extruded tube with an inclination for a line of cut.

12. The motor vehicle equipment assembly as claimed in claim 1, wherein the edge is embedded in a facade.

13. The motor vehicle equipment assembly as claimed in claim 1, wherein the edge is embedded by overmolding a facade onto the edge.

14. A motor vehicle equipment assembly, comprising:
   an air bag support;
   a gas generator;
   an air bag fixed to the support;
   a force spreader plate for spreading the impact force from a passenger over the air bag, said plate having an inside surface; and
   frangible fixing element fixing said plate relative to the support when the air bag is in a rest configuration, said fixing element being broken under the force for deploying the air bag;
   wherein the air bag comprises the force spreader plate and a sheath of substantially closed cross-section,
   wherein the sheath has an inside surface and a first end,
   wherein the sheath has a second end formed by an edge of closed outline,
   wherein an inside volume of the air bag is defined in a portion adjacent to the second end of the sheath by the inside surface of the sheath and by a portion of the inside surface of the force spreader plate,
   wherein said inside surface of the sheath and said portion of the inside surface of the force spreader plate are exposed to a gas introduced into the air bag by said gas generator during deployment of the air bag, and
   wherein a cross-section of the sheath in a plane perpendicular to a deployment direction of the air bag is substantially constant, when the air bag is in a deployed state.

15. An airbag assembly of a motor vehicle, comprising:
    an air bag support;
    an air bag fixed to the support;
    a force spreader plate for spreading the impact force from a passenger over the air bag, said plate comprising one wall of said air bag such that an inside surface of the force spreader plate is exposed to a gas introduced into the air bag by a gas generator during deployment of the air bag; and
    frangible member connecting said plate to the support when the air bag is in a rest configuration, said member braking under a force for deploying the air bag.

* * * * *